US005811143A

United States Patent [19]
Ingemanson

[11] Patent Number: 5,811,143

[45] Date of Patent: Sep. 22, 1998

[54] INFRARED RADIATION TREATMENT OF INFECTED AGRICULTURAL PRODUCTS

[76] Inventor: Mats O. Ingemanson, 561 Hudson St., Suite 112, New York, N.Y. 10014

[21] Appl. No.: 871,475

[22] Filed: Jun. 9, 1997

Related U.S. Application Data

[60] Provisional application Nos. 60/019, 599, Jun. 11, 1996 and 60/020,139, Jun. 20, 1996.

[51] Int. Cl.[6] ...... A23L 3/00

[52] U.S. Cl. ...... 426/241; 426/521; 250/504 R

[58] Field of Search ...... 426/241, 520, 426/521; 250/504 R

[56] References Cited

U.S. PATENT DOCUMENTS

| | | | |
|---|---|---|---|
| 2,953,429 | 9/1960 | Shiffler | 426/241 |
| 5,472,720 | 12/1995 | Rakhimov et al. | 426/241 |

FOREIGN PATENT DOCUMENTS

| | | | |
|---|---|---|---|
| 1443868 | 12/1988 | U.S.S.R. | 426/241 |

*Primary Examiner*—George Yeung
*Attorney, Agent, or Firm*—Law Offices of John A. Parrish

[57] ABSTRACT

The disclosed invention relates to treatment of agricultural products such as wheat with infrared radiation, particularly wheat infected with *T. indica* Teliospores, to kill the spores. The agricultural products are treated with infrared radiation generated by ceramic heating elements at intensities of 5–34 $KW/m^2$ for varying time periods.

12 Claims, No Drawings

INFRARED RADIATION TREATMENT OF INFECTED AGRICULTURAL PRODUCTS

Priority is claimed to United States provisional application 60/019,599 filed Jun. 11, 1996 and to United States provisional application 60/020,139 filed Jun. 20, 1996.

FIELD OF THE INVENTION

The invention relates to elimination of fungi, bacteria and viruses of grains and other agricultural products with radiation, especially infrared radiation.

BACKGROUND OF THE INVENTION

Loss of grains and agricultural products such as beans, wheat, corn, fruit and nuts due to fungi, bacteria and viruses has been a persistent problem in the agricultural industry. Losses due to fungi, bacteria, viruses and the like is millions of dollars. Losses of wheat crops due to *Tilletia indica* Teliospores(Karnal bunt), *Tilletia controvsa* Kuhn (TCK) and *Tilletia caries* Teliospores(Common bunt) is especially severe.

Prior methods to sterilize *Tilletia indica* Teliospores (Karnal bunt), *Tilletia controvsa* Kuhn, *Tilletia caries* (Common bunt) and other fungi, bacteria and viruses related to wheat, beans, corn, fruit, nuts and other agriculture products have substantial drawbacks in that they do not completely eliminate the fungi, bacteria and viruses. Also, these methods may be poisonous, corrosive or damaging to agricultural products and the environment.

A need therefore exists for treatment which eliminates fungi, bacteria and viruses, such as, *Tilletia indica* Teliospores(Karnal bunt), *Tilletia controvsa* Kuhn, and *Tilletia caries* Teliospores(Common bunt) from grains and agricultural products such as beans, wheat, corn, fruit and nuts.

SUMMARY OF THE INVENTION

In accordance with the invention, agricultural products are treated to eliminate infestation by exposing said products to infrared radiation generated by a ceramic heating element for a time sufficient to kill said infestation. These products include, for example, wheat, beans, corn, fruit and nuts. The infrared radiation generated in accordance with the invention is particularly suited for treating wheat to kill infestations such as *Tilletia indica* Teliospores, *Tilletia controvsa* Kuhn, and *Tilletia caries* Teliospores. Infrared radiation at an intensity of about 8.5–34 $kW/m^2$ can be employed to eliminate these infestations by exposing the wheat to radiation at these intensities for about 5 to about 300 seconds. The wheat may be moistened with an aqueous solution having a temperature of 40°–80° C. prior to exposure to the infrared radiation.

Having summarized the invention, the invention will now be described in detail by reference to the following description.

DETAILED DESCRIPTION OF THE INVENTION

In accordance with the invention, agricultural products such as wheat, beans, corn, fruit and nuts as well as meats can be treated with infrared radiation generated by ceramic heating elements to eliminate pathogens and fungi. Ceramic heating elements suitable for use in the invention include those which employ a ceramic tube as shown in U.S. Pat. No. 5,472,720. The ceramic tube has thereon a ceramic material as also shown in U.S. Pat. No. 5,472,720. The ceramic tube can be any of quartz and mullite, preferably quartz. The ceramic material may be any composition within the range identified as formulation A in U.S. Pat. No. 5,472,720. The teachings of U.S. Pat. No. 5,472,720 are incorporated by reference herein in their entirety.

Generally, in a first embodiment of the invention, agricultural products are placed into the apparatus shown in FIG. 1 of U.S. Pat. No. 5,472,720 and which employs the aforementioned ceramic heating elements. As described in U.S. Pat. No. 5,472,720, a ceramic reflector having a composition within the scope of formulation B of U.S. Pat. No. 5,472,720 is positioned above the ceramic heating element. The apparatus is energized to cause the ceramic heating elements to generate infrared radiation at an intensity of 5–34 $KW/m^2$.

In a preferred aspect, the ceramic heating element employs a quartz tube having thereon a layer of ceramic material, hereinafter referred to as composition L1, that has the following weight percent composition:

| Composition L1 | |
|---|---|
| $MgAl_2O_4$ | about 0.5–about 10% |
| $YCrO_3$ | about 0.5–about 3.0 |
| $MgCrO_4$ | about 1.0–about 15.0 |
| $CeO_2$ | about 0.1–about 1.0 |
| $ZrO_2$ | about 0.5–about 5.0 |
| $CaZrO_3$ | about 0.05–about 05 |
| $LaCrO_3$ | The Rest |

which is within formulation A of U.S. Pat. No. 5,472,720. The ceramic reflector employed has the composition, hereinafter referred to as composition R1, of the following wt. % amounts:

| Composition R1 | |
|---|---|
| $SiO_2$ | 10.0–28.0 |
| $Fe_2O_3$ | 15.0–35.0 |
| $Al_2O_3$ | 0.5–3.5 |
| CuO | 0.1–2.0 |
| CaO | 0.5–15.0 |
| MgO | 0.1–3.0 |
| $Cr_2O_3$ | The Rest |

which is within formulation B of U.S. Pat. No. 5,472,720. The heating elements are energized to heat the chamber of the apparatus to a desired temperature prior to placing the wheat into the chamber for exposure to infrared radiation generated by the heating elements. The results of treatment of the wheat are shown in Tables 1 and 1A.

TABLE 1

| | Irradiation of *T. Caries Teliospore* Infected Wheat | | | |
|---|---|---|---|---|
| Sample Number | Time Period[1] of Radiation (Sec.) at intensity of 14.7 $KW/m^2$ | Temp. (°C.) of Treatment[2] | % of Total Wheat Seeds in Sample vs. Control Which Germinated[3] | % Spore germination in sample after treatment[4] |
| control | 0 | | | 6 |
| 1 | 10 | 60 | 108 | 6.5 |
| 2 | 20 | 77 | 54 | 3.25 |
| 3 | 30 | 90 | 29 | 1.75 |
| 4 | 40 | 103 | 8 | 0.5 |
| 5 | 50 | 116 | 4 | 0.25 |
| 6 | 60 | 127 | 0 | 0 |

TABLE 1-continued

Irradiation of *T. Caries Teliospore* Infected Wheat

| Sample Number | Time Period[1] of Radiation (Sec.) at intensity of 14.7 KW/m$^2$ | Temp. (°C.) of Treatment[2] | % of Total Wheat Seeds in Sample vs. Control Which Germinated[3] | % Spore germination in sample after treatment[4] |
|---|---|---|---|---|

[1]Ceramic heating element of U.S. Pat. No. 5,472,720 formed of a quartz tube and an outer layer of ceramic material of L1 and a ceramic reflector having the composition R1.

[2]Temperature of treatment chamber prior to exposure of wheat to infrared radiation.

[3]Percentage = (% of germinated seeds observed in sample after treatment)/(% of Total seeds in sample which germinated in control sample)*100%

[4]11 days after irradiation; Control sample not irradiated

TABLE 1A

Irradiation of *T. Indica Teliospore* Infected Wheat

| Sample Number | Time Period[1] of Radiation (Sec.) at intensity of 14.7 KW/m$^2$ | Temp. (°C.) of Treatment[2] | % of Total Wheat Seeds in Sample vs. Control Which Germinated[3] | % Spore germination in sample after treatment[4] |
|---|---|---|---|---|
| control | 0 | | | 10.25 |
| 7 | 10 | 60 | 78 | 8 |
| 8 | 20 | 77 | 63 | 6.5 |
| 9 | 30 | 90 | 27 | 2.75 |
| 10 | 40 | 103 | 7 | 0.75 |
| 11 | 50 | 116 | 7 | 0.75 |
| 12 | 60 | 127 | 0 | 0 |

[1]Ceramic heating element of U.S. Pat. No. 5,472,720 formed of a quartz tube and an outer layer of ceramic material of L1, and ceramic reflector having the composition R1.
[2]Temperature of treatment chamber prior to exposure of wheat to infrared radiation.
[3]Percentage = (% of germinated seeds observed in sample after treatment)/(% of Total seeds in sample which germinated in control sample)*100%
[4]16 days after irradiation; Control sample not irradiated In another embodiment, agricultural products are placed into an apparatus such as that shown in FIG. 1 of U.S. Pat. No. 5,472,720, and which employs the ceramic heating elements described above. In this embodiment, the apparatus is as described in U.S. Pat. No. 5,472,720 except that an aluminum reflector is substituted for the aforementioned ceramic reflector. In this embodiment, the apparatus is energized to cause the ceramic heating elements to generate infrared radiation at an intensity of about 5–34 KW/m$^2$.

In a preferred aspect, the ceramic heating elements, as described above, include a quartz tube having a layer of ceramic material of composition L1 thereon. The heating elements are energized to raise the temperature of the chamber to a desired temperature prior to subjecting the sample to infrared radiation at intensities of 8.5 KW/m$^2$ to 34 KW/m$^2$ for various time periods. The results are shown in Table 2.

TABLE 2

Irradiation of *T. Caries Teliospore* Infected Wheat

| Sample Number | Time Period[1] of Radiation (Sec.) at intensity of 8.5 KW/m$^2$ | Temp. (°C.) of Treatment[2] | % of Total Wheat Seeds in Sample vs. Control Which Germinated[3] | % Spore germination in sample after treatment[4] |
|---|---|---|---|---|
| Control A | 0 | | 17.73 | |
| Control B | 0 | | 15.32 | |
| 13 | 60 | 60 | 18.18 | 110 |
| 14 | 300 | 223 | 0 | 0 |
| 15 | 600 | 246 | 0 | 0 |
| 16 | 1200 | 250 | 0 | 0 |

[1]Ceramic heating element of U.S. Pat. No. 5,472,720 formed of a quartz tube and an outer layer of ceramic material of L1. An aluminum reflector is used.
[2]Temperature of treatment chamber prior to exposure of wheat to infrared radiation.
[3]Percentage = (% of germinated seeds observed in sample after treatment)/(average % total seeds in control samples A and B which germinated)*100%.
[4]11 days after irradiation; Control sample not irradiated

TABLE 2A

Irradiation of *T. Indica Teliospore* Infected Wheat

| Sample Number | Time Period[1] of Radiation (Sec.) at intensity of 34 KW/m$^2$ | Temp. (°C.) of Treatment[2] | % of Total Wheat Seeds in Sample vs. Control Which Germinated[3] | % Spore germination in sample after treatment[4] |
|---|---|---|---|---|
| control | 0 | | 17 | |
| 17 | 30 | 266 | 0 | 0 |
| 18 | 60 | 294 | 0 | 0 |
| 19 | 120 | 304 | 0 | 0 |
| 20 | 180 | 313 | 0 | 0 |

[1]Ceramic heating element of U.S. Pat. No. 5,472,720 formed of a quartz tube and an outer layer of ceramic material of L1, and an aluminum reflector.
[2]Temperature of treatment chamber prior to exposure of samples to infrared radiation.
[3]Percentage = (% of germinated seeds observed in sample after treatment)/(% of Total seeds in sample which germinated in control sample)*100%
[4]16 days after irradiation; Control sample not irradiated The above results show that *Tilletia indica* Teliospore are completely eliminated from wheat within 30 seconds by infrared radiation generated according to the invention at an intensity of 34.0 KW/m$^2$ and completely eliminated from wheat within 60 seconds by infrared radiation generated according to the invention at an intensity of 14.7 KW/m$^2$.

The above experiments also show that *Tilletia caries* Teliospore are completely eliminated from wheat within 300 seconds by infrared radiation generated according to the invention at an intensity of 8.5 KW/m$^2$ and completely eliminated from wheat within 60 seconds by infrared radiation generated according to the invention at an intensity of 14.7 KW/m$^2$.

In an alternative embodiment, agricultural products such as wheat infected with spores of Karnal bunt are subjected to shattering by shaking at a frequency of 4 cycles per second or ultra sound at frequencies of 5000 cycles per second prior to treatment with infrared radiation as described above. Treatment with infrared radiation in accordance with the invention, in combination with shattering, eliminates all *Tilletia indica* Teliospores from the contaminated wheat.

Where only the surface of the wheat is infected with *Tilletia indica* Teliospores, the wheat can be subjected to shattering without radiation by shaking the wheat by hand at a frequency of 4 cycles/sec for 2 minutes. Visual examination of the wheat by microscope shows a 100% reduction in the population of live *Tilletia indica* Teliospores.

Shattering without radiation can be employed to sterilize agricultural products such as wheat which are only topically infected with, for example, *Tilletia indica* Teliospores (Karnal bunt). In this embodiment, an agricultural product such as wheat that only is topically infected with *Tilletia indica* Teliospores(Karnal bunt) is sterilized by shattering through shaking, vibration or other abrupt movements. Wheat infected with *Tilletia indica* Teliospores(Karnal bunt), after having been subjected to shattering in accordance with the invention, is free of *Tilletia indica* Teliospores and shows improved germination rates.

In this embodiment where shattering is used, and as shown in Examples 21–23 set forth in Table 3, wheat seeds topically infected with *Tilletia indica* Teliospores are placed into a Petri dish and subjected to shattering by hand shaking for 1–3 minutes at 4 cycles per second. As shown in Example 21, only 2.5% of the original amount of *Tilletia indica* Teliospores present on the topically infected wheat survived after shattering by hand shaking for one minute at 4 cycles per sec.

In Example 22, the procedure of Example 21 is repeated except that shattering is continued for 2 minutes. In Example 23, the procedure of Example 21 is repeated except that shattering is continued for 3 minutes. The results, as depicted in Table 3, show that none of the original amount of *Tilletia indica* Teliospores on the wheat survived after 2 minutes of shattering. The treated wheat, however, germinated 100% after 5 days and is fit for human consumption and is suitable for use as plant seeds. The results also show that 100% of the *Tilletia indica* Teliospores were destroyed after three minutes of shattering. However, 100% of the wheat germinated after 5 days. The wheat is edible for human consumption and is also useful as plant seeds.

In Examples 21–23 shown in Table 3, the frequency of shaking is 4 cycles per second. Frequencies of less than about 2 cycles per second up to ultrasound frequencies, however, also may be employed for shattering. Preferably, the frequency is about 4 cycles per second.

TABLE 3

Sterilization by Shattering of Wheat Topically Infected With *T. Indica Teliospores.*

| Example | Time of shattering (Minutes) | % *T. Indica Teliospore* Survivors | | | | Average % *T. Indica Teliospore* Survivors |
|---|---|---|---|---|---|---|
| Control | 0 min | 10% | 7% | 6% | 11% | 8.5% |
| 21 | 1 min | 3 | 2 | | | 2.5 |
| 22 | 2 min | 0 | 0 | 0 | 0 | 0 |
| 23 | 3 min | 0 | 0 | 0 | 0 | 0 |

[1]Frequency of shaking is 4 cycles per sec.

Storage and/or processing of large quantities of grain such as wheat presents risk of fire and explosion. This risk, in wheat, is influenced by factors such as the temperature of the wheat reached during processing and/or storage, the concentration of wheat dust in the air, and the heat generated by growth of fungus which can cause spontaneous combustion.

Treatment of grains such as wheat in accordance with the invention advantageously avoids heating the wheat to its combustion temperature. The invention eliminates Karnal bunt in about 10 seconds whereas a heat level sufficient for wheat combustion is not reached until at least 30 seconds. This provides a safety window of 20 seconds (or 200%). In addition, the process of the invention advantageously prevents spontaneous combustion by killing fungus present in the wheat before storage.

In another embodiment, wheat moistened with a solution of surfactant and water is employed. The solution preferably is a solution of Tween 20 surfactant and water produced by adding about 5–50 drops of Tween 20, preferably about 15 drops of Tween 20 to about 100 mL of water. Tween 20, commercially available from Aldrich Chemical Co., Milwaukee, Wis., is the preferred surfactant. Other surfactants similar to Tween 20 may be used. Wheat infected with *Tilletia indica* Teliospores is immersed for about 10–60 seconds in the solution of surfactant and water having a temperature range of 40°–80° C., preferably 80° C. The wheat then is treated with infrared radiation at an intensity of about 5–34 KW/m$^2$ for about 10–300 seconds using the ceramic heating elements as described above, preferably at an intensity of 34 KW/m$^2$ for 10 seconds.

In this embodiment, an aluminum reflector is substituted for the ceramic reflector employed in the apparatus of U.S. Pat. No. 5,472,720. Wheat is placed on a wire mesh screen, such as screen 210 of U.S. Pat. No. 5,472,720, for treatment with infrared radiation. The infrared radiation is generated by the ceramic heating elements. The ceramic heating elements, as described above, employ a quartz tube that is covered with a layer of ceramic material of the composition L1. In addition, an aluminum reflector is provided below the screen. The screen having the wheat thereon can be positioned in a wide range of distances between the upper and lower aluminum reflectors to achieve a desired intensity of exposure of the wheat to the infrared radiation onto all surfaces of the wheat seeds. Preferably, the wire mesh screen having the wheat thereon is about 2–3 inches from the lower aluminum reflector and about 2–3 inches from the upper aluminum reflector.

In this embodiment, it is preferred that the upper and lower aluminum reflectors have a concave shape, wherein the concave surfaces of the reflectors face the wheat present on the screen more preferably, the upper aluminum reflector has an ellipsoidal shape, and the lower aluminum reflector has a parabolic shape. Although in this embodiment it is preferred to moisten the wheat as described above prior to treatment with radiation, the infrared radiation can be applied to treat dry wheat.

Irradiation of uninfected wheat

In order to assess the effect of infrared radiation generated in accordance with the invention on germination of uninfected wheat, samples of uninfected wheat are prepared by moistening the wheat with a solution of Tween 20 surfactant in water. The solution is prepared by adding 15 drops of Tween 20 to 100 mL of water. The wheat is treated in the solution for about 30 sec. to about 5 minutes. Samples of the moistened, uninfected wheat are placed onto a wire mesh screen for placement into the apparatus shown in FIGS. 1–5 of U.S. Pat. No. 5,472,720 that has been modified by substituting an aluminum reflector for the ceramic reflector. This apparatus also employs an additional aluminum reflector below the screen as described above. The ceramic heating element, as shown in U.S. Pat. No. 5,472,720, includes a heating element having a quartz tube having thereon a layer of a ceramic material having the composition L1 which is within formulation A shown in U.S. Pat. No. 5,472,720. Electricity is passed through the ceramic heating element having the above mentioned layer of ceramic material thereon to cause the temperature of the heating chamber of the apparatus to reach 300° C. Samples of the moistened wheat on the wire mesh screen then are inserted into the heating chamber and exposed to infrared radiation generated by the ceramic heating element for various time periods. All exposure times are at an intensity of 34 $KW/m^2$. The temperature of the heating chamber prior to insertion of the wheat for exposure to the infrared radiation is 300° C. The results are shown in Table 4.

TABLE 4

Germination of Uninfected Renville Durum Wheat Treated with Infrared Radiation

| Time of treatment (Sec.) | % Reduction of Germination |
|---|---|
| Control - 0 | 0 |
| 5 | 5.33 |
| 10 | 36.88 |
| 15 | 62.38 |
| 20 | 85.27 |

As shown above, a 5 second exposure of uninfected wheat to infrared radiation in accordance with the invention only reduces seed germination by 5.33%. This small reduction is considered acceptable by industry for plant seed quality. In addition, only a reduction of only 36.88% occurs after a 10 second exposure.

Treatment of *T. indica* Teliospores Spores Inside Unbroken Seed Coats with Zero Tolerance Samples of *Tilletia indica* teliospores (Karnal bunt) inside infected wheat seeds are moistened with a solution of Tween 20 surfactant in water by exposing the wheat to a solution of the surfactant and water for 30 seconds and for five minutes. The solution is formed by adding 15 drops of Tween 20 surfactant to 100 mL of water. The wheat seeds then are positioned on a wire mesh screen using the apparatus shown in FIGS. 1–5 of U.S. Pat. No. 5,472,720. The ceramic heating element, as shown in U.S. Pat. No. 5,472,720, includes a quartz tube having thereon a layer of a ceramic material of composition L1 within formulation A of U.S. Pat. No. 5,472,720. As described above, the upper and lower reflectors are aluminum. Electricity is passed through the ceramic heating element having the above mentioned layer of ceramic material thereon to cause the temperature of the heating chamber of the apparatus of FIG. 1 to reach a desired temperature. Samples of the moistened wheat then are inserted into the heating chamber and exposed to infrared radiation generated by the ceramic heating element for various time periods. The results, shown in Table 5, are generated by using radiation at an intensity of 34 $KW/m^2$. In addition, the temperature of the heating chamber is 300° C. prior to irradiation.

To evaluate spore growth, *Tilletia indica* teliospores are removed from the irradiated wheat and placed into a petri dish with sterile agar. The petri dish is placed in an incubator at a constant temperature of 18° C. The petri dish then is examined for growth of *Tilletia indica* teliospores after 6 weeks. Similarly, and to evaluate seed germination, the irradiated wheat seeds are placed into a petri dish with two paper filters soaked with 10 mL distilled water. The dish is incubated at 18° C. and examined for germination after 3–6 days. Germinated seeds are removed. The petri dish is reexamined for wheat seed germination after 12 days incubation. The results, shown in Table 6, are generated by using radiation at an intensity of 34 $KW/m^2$. In addition, the temperature of the heating chamber is 300° C. prior to irradiation.

TABLE 5

Treatment of *T. Indica Teliospores* Spores Inside Unbroken Seed Coats with Zero Tolerance[1]

| Time of Exposure to Infrared Radiation (Sec.) | Spore Growth From *T. Indica Teliospore* Infected Seeds[2] | Germination of Uninfected Durum Wheat Seeds(%)[3] | Seed Condition after Exposure to Infrared Radiation |
|---|---|---|---|
| Control - 0 | Growth | 100 | Not Roasted |
| 6 | Growth | 100 | Not Roasted |
| 8 | Growth | 72 | Not Roasted |
| 10 | No Growth | 33 | Not Roasted |
| 15 | No Growth | 0 | Not Roasted |
| 20 | | | Not Roasted |
| 25 | | | Roasted |

[1]All samples moistened with the above-described Tween 20 solution for five minutes.
[2]Measured after 6 weeks incubation at 18° C.
[3]Measured after 12 days incubation at 18° C.

TABLE 6

Infrared Radiation Treatment of *T. Indica Teliospores* Spores Inside Unbroken Seed Coats with Zero Tolerance[1]

| Time of Exposure to Infrared Radiation (Sec.) | Spore Growth From *T. Indica Teliospore* Infected Seeds | Germination of Uninfected Durum Wheat Seeds(%) | Seed Condition after Exposure to Infrared Radiation |
|---|---|---|---|
| Control- 0 | Growth | 51 | Not Roasted |
| 10 | No Growth | 35 | Not Roasted |
| 15 | No Growth | 8 | Not Roasted |
| 20 | No Growth | 2 | Not Roasted |
| 25 | No Growth | | Roasted |

[1]All samples moistened with the above-described Tween 20 solution for 30 seconds.
[2]Measured after 6 weeks incubation at 18° C.
[3]Measured after 12 days incubation at 18° C.
The results show that there was no growth of *T. Indica teliospores* (based on zero tolerance) inside the unbroken seed coats of wheat after treatments of 10 seconds, 15 seconds and 20 seconds when treated with infrared radiation in accordance with the invention.

Mixograph Analysis

Samples of wheat treated in accordance with the invention are also evaluated by the well known Mixograph procedure. In this procedure, 9 grams of ground wheat and 6 mL of distilled water are employed. The Mixograph spring setting was 8.

The resulting mixogram pattern for the control samples is similar to the mixogram patterns for the samples treated with 5-second and 10-second exposures of infrared radiation in accordance with the invention at an intensity of 34 $KW/m^2$. For samples treated with 15-second, 20-second, and 10-second exposures of infrared radiation in accordance with the invention at an intensity of 34 $KW/m^2$, the mixogram patterns showed much stronger gluten characteristics than the samples treated to 5-second and 10-second exposures of infrared radiation in accordance with the invention at an intensity of 34 $KW/m^2$.

The invention has been described above as particularly suitable for eliminating Karnal bunt, TCK and common bunt in free form and contained inside sori of wheat, while the wheat quality (based on germinability) was preserved. However the invention may be readily employed to treat agricultural products and contaminated food including wheat, rye, soybeans, barley, oats, rice, sorghum, cottonseed, corn, pop corn, corn based cereals, corn products, corn starch, fruits, nuts, tree nuts, milk, poultry, dairy cattle, hominy grits, other grits, multigrain cereal, cheese snacks, chocolate products, to eliminate pathogens such as Halo Blight, Ergot, Myotoxins such as Aflatoxins, Aspergillusflavus, Ochratoxins such as Ochratoxin A, Zearalenone, Vomitoxin/Don, T-2 toxin, sterigmatocystin, as well as Fumonins B1 and B2, Fusarochromanone, Zearaleone, Cyclopiazonic Acid, 3-Nitropropionic Acid, Citrinin, Xanthomegnin, Viomellein, Vioxanthin, Penicillic acid, Secalonic Acid D, Citeoviridin, Roquefortine C, Trichothecnes, Moniliformin, Fusarin C, Alternaroils and Tenuazonic Acid and other Mycotoxins.

The invention may also be readily employed to treat agricultural products and contaminated food including raw meats(all types), ready-to-eat meats, undercooked and raw hamburger, dry-cured salami, fermented raw-meat sausages, meat products and gravy, other meats, raw and cooked poultry, pasta, sauces, food mixtures, soups, casseroles, eggs, milk, raw milk, dairy products, pasteurized fluid milk, cheeses, cheese products, ice cream, fish, raw and smoked fish, shrimp, oysters, shellfish, raw shellfish, frog legs, yeast, Coconut, sauces, fresh and raw vegetables, rice products, potatoes, salads (including potato, tuna, shrimp, macaroni, and chicken), salad dressing, cake mixes, fruits, strawberries, frozen strawberries, raspberries, frozen raspberries, cream-filled desserts, toppings, frostings, pastries, dried gelatin, peanut butter, cocoa, chocolate, puddings, apple juice, water, ice, to eliminate pathogens such as Pathogenic Bacteria such as Salmonella spp., coli 0157:H7, *E. Coli*(EXEC), Shigela spp., *B. cereus,* miscellaneous enterics, *C. perfringens, L. monocytogenes, V. vulnificas, V. parahaemolyticus, V. cholerae* Serogroupol, Streptococcus spp., *C. botulinum, Y. enterocolitica, A. hydrophila, C. jejuni, S. Aurous, P. Shigelloides,* Campylobacter, Shiga-like toxin-producing *Eschirichia coli,* Vibrio, *Taxoplasma gondil, Cryptosporidium parvum* as well as viruses such as Norwalk virus, Hepatitis A, Hepatitis B, and Hepatitis C.

The invention may also be readily employed to treat grains and agricultural products including wheat, rye, soybeans, barley, oats, rice, sorghum, cottonseed and corn to eliminate insects, insect larvae's and insect pests such as *Ephestia cautella, Ephestia elutella, Ephestia kuehniella, Oryzaephillis sumamensis, Plodia interpunctella, Rhyzopertha dominica, Sitophilus oryzae, Tribolium confusum, Tribolium castaneum, Tribolium madens, Tribolium variable, Sitophilus granarius, Sitophilus zeamais, Oryzaephilus surinamensis, Oryzaephilus mercator, Lasioderma serricorne, Trogoderma granarium, Trogoderma glabrum, Trogoderma inclusum, Cryptolestes ferrugineus, Cryptolestes pusillus, Acarus siro* L. *Attagenus piceus* Oliv., *Tenebrio molitor* (L.), *Tenebrio obscurus, Sitoroga cerealella.*

As mentioned, Tween 20 can be used as a surfactant when used in water to provide a solution for moistening of, for example, wheat prior to irradiation. Other useful surfactants include fatty acid surfactants such as poly(oly-1,2-ethanediyl) derivatives, Sorbitan, Monododecanote, Sorbimacrogol Laurate 300, polyoxyethylene (20) sorbitan, and Liposorb L-20.

In addition to the advantages of the invention as described above, the invention advantageously can be easily applied to all types of surfaces including vertical surfaces. It is neither poisonous, corrosive nor damaging to the environment, and does not have hazardous, toxic or environmental side effects. The invention advantageously enables sterilization of wheat by irradiating Karnal bunt, TCK and common bunt while preserving the wheat quality.

What is claimed is:

1. A method for treating agricultural products having any of fungal, bacterial or viral infestation to eliminate said infestation without destroying germination ability of said products comprising, exposing said products to infrared radiation at an intensity of about 8.5–34 $KW/m^2$ generated by a ceramic heating element for a time sufficient to kill said infestation but without destroying germination ability of said products.

2. The method of claim 1 wherein said products are selected from the group consisting of wheat, beans, corn, fruit and nuts.

3. The method of claim 2 wherein said product is wheat and said infestation is any of *Tilletia indica* Teliospores, *Tilletia controvsa* Kuhn, and *Tilletia caries* Teliospores.

4. The method of claim 3 wherein said time is about 10 to about 60 seconds.

5. The method of claim 4 wherein said agricultural products are vibrated at a frequency of at least two cycles per second prior to said exposing.

6. The method of claim 1 wherein said ceramic heating element comprises a quartz tubular element having thereon a layer of a ceramic material of the composition of about 0.5-about 10 wt. % $MgAl_2O_4$, about 0.5-about 3.0 wt. %$YCrO_3$, about 1.0-about 15.0 wt. % $MgCrO_4$, about 0.1–about 1.0 wt. %$CeO_2$, about 0.5-about 5.0 wt. % $ZrO_2$, about 0.05–about 5 wt. % $CaZrO_3$, and the remainder is $LaCrO_3$.

7. The method of claim 6 wherein said infestation is selected from the group consisting of *T. caries* Teliospores and *T. indica* Teliospores, said intensity is 14.7 $KW/m^2$ and said time is 10–50 seconds.

8. The method of claim 2 wherein said wheat is moistened with an aqueous solution, said intensity is 34 $KW/m^2$, and said time is 10 seconds.

9. The method of claim 1 wherein said irradiation is performed in a chamber heated to 60°–300° C.

10. The method of claim 6 wherein said infestation is *T. caries* Teliospores, said intensity is 8.5 $KW/m^{2,}$ and said time is 60 seconds.

11. The method of claim 7 wherein said irradiation is performed in a chamber heated to 60°–116° C.

12. The method of claim 8 wherein said irradiation is performed in a chamber heated to 300° C.

* * * * *